(12) United States Patent  
Nakashima et al.

(10) Patent No.: US 11,890,695 B2
(45) Date of Patent: Feb. 6, 2024

(54) LASER MARKER

(71) Applicant: BROTHER KOGYO KABUSHIKI KAISHA, Nagoya (JP)

(72) Inventors: Kazuhiro Nakashima, Nagoya (JP); Yasuo Nishikawa, Nagoya (JP); Kosuke Ushiroda, Komaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 393 days.

(21) Appl. No.: 17/207,213

(22) Filed: Mar. 19, 2021

(65) Prior Publication Data
US 2021/0205921 A1 Jul. 8, 2021

Related U.S. Application Data

(63) Continuation of application No. PCT/JP2019/046542, filed on Nov. 28, 2019.

(30) Foreign Application Priority Data

Jan. 30, 2019 (JP) ................................. 2019-014495

(51) Int. Cl.
B23K 26/082 (2014.01)
B23K 26/064 (2014.01)
(Continued)

(52) U.S. Cl.
CPC .......... *B23K 26/082* (2015.10); *B23K 26/064* (2015.10); *B23K 26/08* (2013.01); *B23K 26/702* (2015.10); *B41J 2/47* (2013.01)

(58) Field of Classification Search
CPC .... B23K 26/082; B23K 26/064; B23K 26/18; B23K 26/702; B23K 37/02;
(Continued)

(56) References Cited

U.S. PATENT DOCUMENTS 6,881,925 B1 * 4/2005 Sato ..................... B23K 26/356
219/121.73
2015/0079216 A1 * 3/2015 Brooks ................ B23K 26/355
285/272
(Continued)

FOREIGN PATENT DOCUMENTS

JP H07-191246 A 7/1995
JP H07191246 A * 7/1995
(Continued)

OTHER PUBLICATIONS

Thor Labs, Sep. 2014, https://web.archive.org/web/20140906185539/http://www.thorlabs.com/newgrouppage9.cfm?objectgroup_id=47, Wayback Machine, BA1L.*
(Continued)

*Primary Examiner* — Tu B Hoang
*Assistant Examiner* — Damon Joel David Alfaro
(74) *Attorney, Agent, or Firm* — K&L Gates LLP

(57) ABSTRACT

A laser marker includes: a base including: a first guide portion; and a restriction part; a laser oscillator configured to emit laser light, the laser oscillator being removably mounted to the base by sliding in a mounting direction with being placed on the base, the laser oscillator including: a second guide portion extending in the mounting direction, the second guide portion being configured to be engaged with the first guide portion; a contact part configured to be in contact with the restriction part in a case the laser oscillator is mounted to the base; and an expander; and a scanner having an insertion part, the expander being inserted into the insertion part in a case the laser oscillator is mounted to the scanner, and the scanner being configured to scan the laser light emitted from the laser oscillator.

6 Claims, 13 Drawing Sheets

(51) Int. Cl.
*B23K 26/70* (2014.01)
*B23K 26/18* (2006.01)
*B41J 2/47* (2006.01)
*B23K 26/08* (2014.01)

(58) Field of Classification Search
CPC ............ B23K 26/0096; B23K 26/0648; B23K 26/0869; B23K 26/355; B23K 26/359; B41J 2/47; H01S 3/005; H01S 3/02
See application file for complete search history.

(56) References Cited

U.S. PATENT DOCUMENTS

| | | | | |
|---|---|---|---|---|
| 2016/0111853 | A1* | 4/2016 | Arnone | G01S 7/495 372/45.012 |
| 2017/0057007 | A1* | 3/2017 | Bravo Montero | H01S 3/02 |
| 2019/0190228 | A1* | 6/2019 | Sato | B23K 26/082 |

FOREIGN PATENT DOCUMENTS

| | | | |
|---|---|---|---|
| JP | 2000-015466 A | | 1/2000 |
| JP | 2000015466 A | * | 1/2000 |
| JP | 2012-222242 A | | 11/2012 |
| JP | 2017-042820 A | | 3/2017 |
| KR | 20180050878 A | * | 5/2018 |
| KR | 20180050878 A | | 5/2018 |
| WO | 2012140797 A1 | | 10/2012 |
| WO | WO-2012140797 A1 | * | 10/2012 ........... B23K 26/082 |

OTHER PUBLICATIONS

Extended European Search Report for corresponding European patent application No. 19914149.0, dated Nov. 16, 2022. (7 pages.).
International Preliminary Report on Patentability dated Jul. 27, 2021 in connection with International PCT Application No. PCT/JP2019/046542 (English translation).
International Search Report dated Feb. 18, 2020 in connection with PCT/JP2019/046542.

* cited by examiner

LASER MARKER

CROSS-REFERENCE TO RELATED APPLICATION

This is a continuation application of International Application No. PCT/JP2019/046542 filed on Nov. 28, 2019 which claims priority from Japanese Patent Application No. 2019-014495 filed on Jan. 30, 2019. The entire subject-matter of the earlier application is incorporated herein by reference.

TECHNICAL FIELD

The present disclosure relates to a laser marker.

BACKGROUND

A variety of technologies relating to a laser marker configured to emit laser light have been suggested. For example, a related-art laser marking device includes an oscillation unit having a laser oscillator configured to oscillate a laser beam, and a scanning unit having a scanner and a lens such as an fθ lens are provided on a single base. In a case where the laser oscillator is attached, the laser oscillator is located such that a floor surface of a holder is located between a first frame and a second frame on an upper surface of the base. At this time, the laser oscillator is positioned such that two positioning pins protruding from the upper surface of the base are each fitted in a positioning hole and a slit of the holder and an optic axis of the laser beam oscillated from a laser chamber passes through a center of a pinhole. The positioning is performed in a horizontal direction by the positioning pins located on a center line of the base in a width direction and in a vertical direction by the upper surface of the base.

SUMMARY

One illustrative aspect of the present disclosure provides A laser marker including: a base including: a first guide portion; and a restriction part; a laser oscillator configured to emit laser light, the laser oscillator being removably mounted to the base by sliding in a mounting direction with being placed on the base, the laser oscillator including: a second guide portion extending in the mounting direction, the second guide portion being configured to be engaged with the first guide portion; a contact part configured to be in contact with the restriction part in a case the laser oscillator is mounted to the base; and an expander; and a scanner having an insertion part, the expander being inserted into the insertion part in a case the laser oscillator is mounted to the scanner, and the scanner being configured to scan the laser light emitted from the laser oscillator.

According to the laser marker of the present disclosure, positioning of the laser oscillator is performed with high accuracy with respect to the scanner in which the expander of the laser oscillator is inserted.

BRIEF DESCRIPTION OF DRAWINGS

Aspects of the disclosure are illustrated by way of example and not by limitation in the accompanying figures in which like reference characters indicate similar elements.

FIG. 11 is a perspective view depicting the laser oscillator, the base and the like.

FIG. 12 is a perspective view depicting the laser oscillator, the base and the like.

DETAILED DESCRIPTION

The laser oscillator may be replaced due to factors such as a failure, a service life and the like. In this case, in the laser marker where a part of the laser oscillator is inserted in the scanner, more suitable positioning of the laser oscillator is needed so as to prevent the part from coming into contact with the scanner and being thus damaged during the replacement.

Therefore, illustrative aspects of the present disclosure provide a laser marker where positioning of a laser oscillator is performed with high accuracy with respect to a scanner in which an expander of the laser oscillator is inserted.

Hereinbelow, the laser marker of the present disclosure will be described with reference to the drawings, based on illustrative embodiments. In FIGS. 1 and 10 to 12 used for descriptions below, some of the basic configuration are omitted.

(1) Outline of Laser Marker

Figure 1:
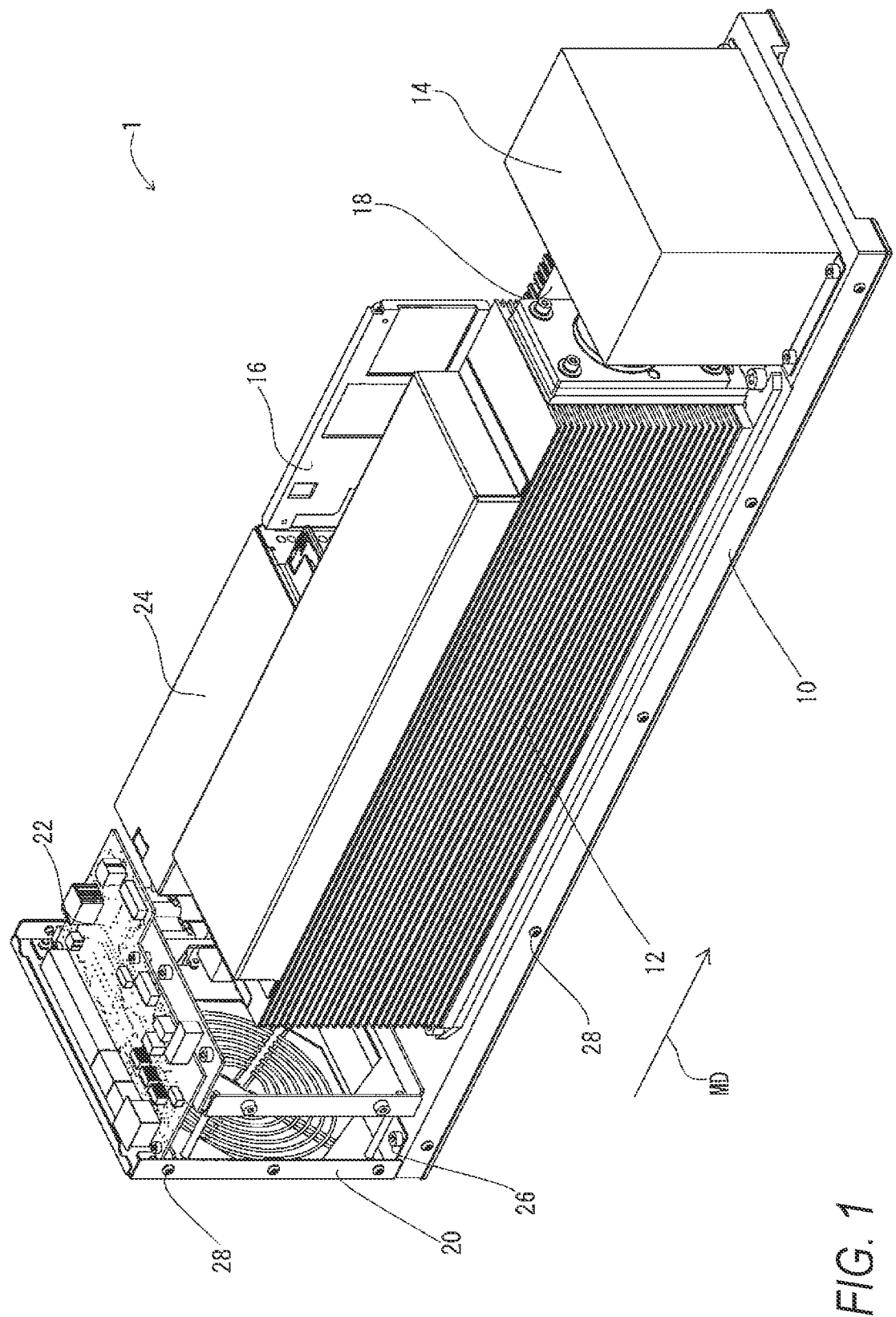
FIG. 1 is a perspective view depicting a laser marker of the illustrative embodiment.

As shown in FIG. 1, a laser marker 1 of the illustrative embodiment includes a base 10. On the base 10, a laser oscillator 12, a scanner 14, a main substrate 16, a galvano substrate 18, a frame 20, a rear substrate 22, a power supplying unit (hereinbelow, referred to as 'PSU') 24, and the like are provided.

The laser oscillator 12 is configured to emit laser light, and is constituted by CO2 laser, YAG laser and the like. In the scanner 14, a galvano scanner (not shown), an fθ lens (102, in FIG. 11) which will be described later and the like are accommodated. The laser light emitted from the laser oscillator 12 is scanned on a processing object by the galvano scanner, the fθ lens and the like in the scanner 14. Thereby, an image such as a character, a figure and the like is marked (printed) on the processing object.

The main substrate 16 and the rear substrate 22 are substrates for controlling the laser marker 1 of the illustrative embodiment. The galvano substrate 18 is a substrate for controlling the galvano scanner in the scanner 14. The frame 20 is provided on its inner side with a fan (not shown). The fan is configured to exhaust the laser marker 1 of the illustrative embodiment. The rear substrate 22 is fixed to an upper part of the frame 20. The PSU 24 is configured to supply power to the laser marker 1 of the illustrative embodiment.

Figure 3:
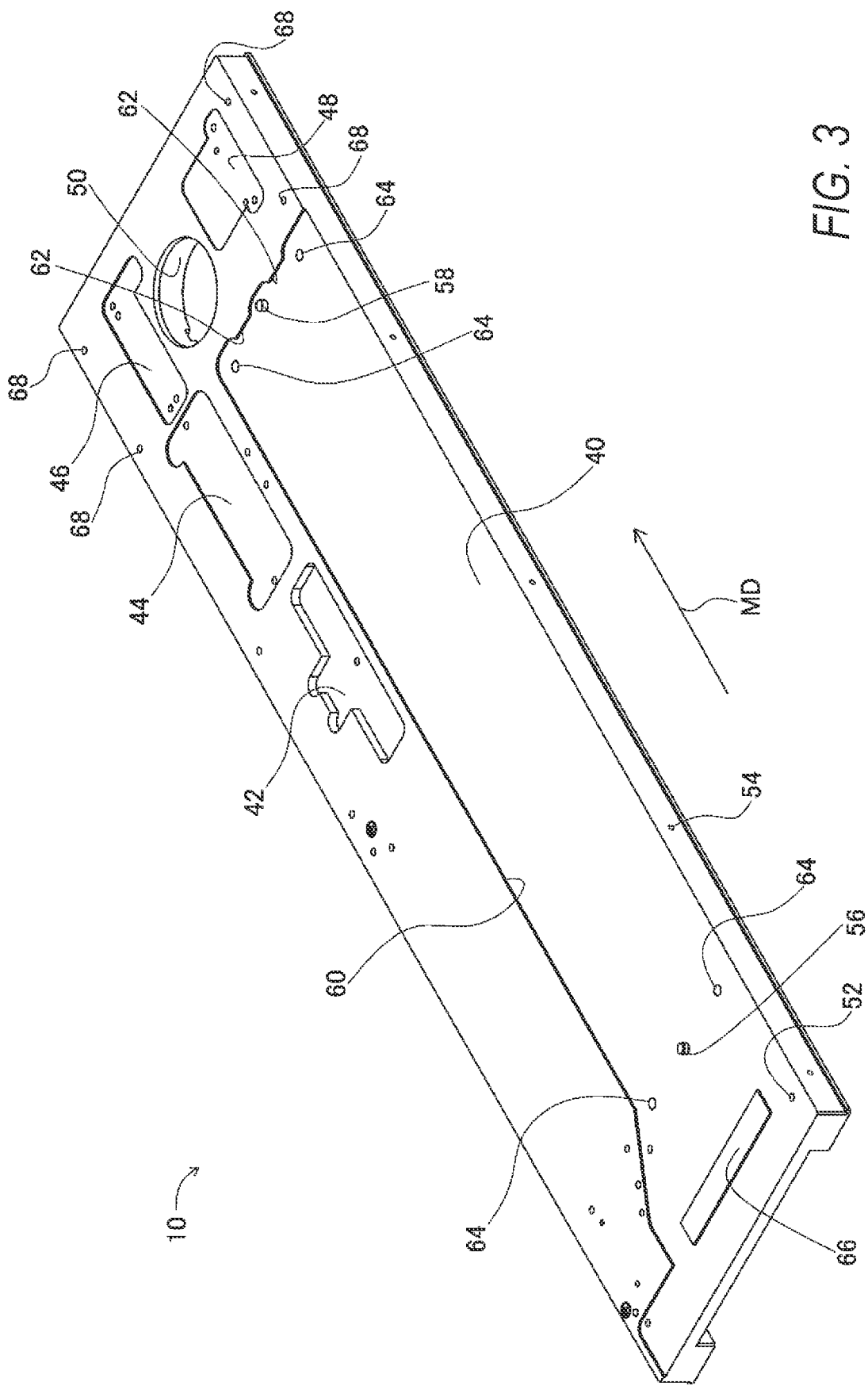
FIG. 3 is a perspective view depicting the base.

The main substrate 16, the galvano substrate 18, the frame 20, the PSU 24 and the like are fixed to the base 10 by screwing fixing screws 26 to fixing holes (52, in FIG. 3)

provided to the base 10, which will be described later. Similarly, the scanner 14 is also fixed to the base 10 by screwing the fixing screws 26 to fixing holes provided to the base 10 (68, in FIG. 3), which will be described later. In contrast, the laser oscillator 12 is positioned by sliding the same on the base 10 in a mounting direction MD and is then fixed to the base 10, as described below.

Note that, a housing cover (not shown) is attached to the base 10 and the frame 20 by attaching screws 28. The laser oscillator 12, the scanner 14, the main substrate 16, the galvano substrate 18, the frame 20, the rear substrate 22, the power supplying unit 24 and the like are covered on the base 10 by the housing cover.

(2) Details of Base

Figure 2:
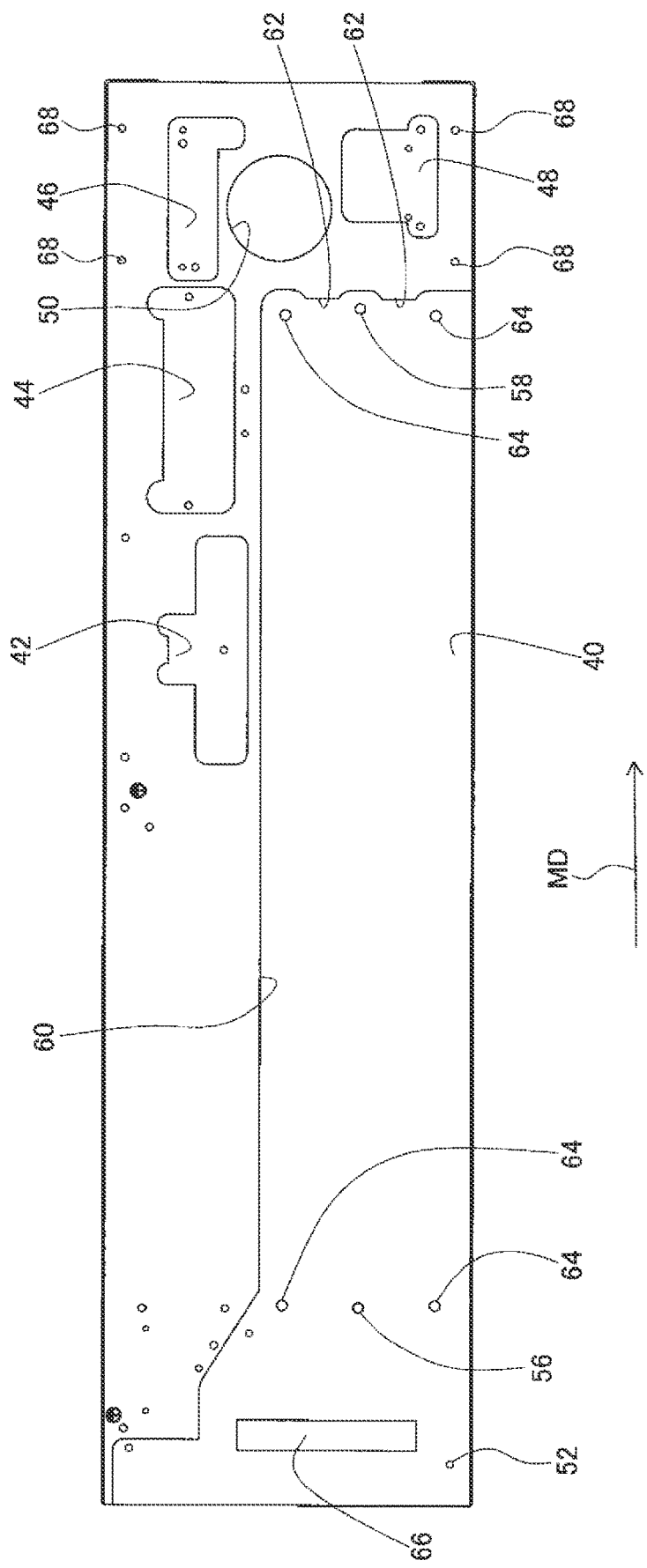
FIG. 2 is a plan view depicting a base of the laser marker.

As shown in FIGS. 2 and 3, the base 10 is substantially rectangular. The base 10 is provided with a plurality of counter-sunk processed surfaces 40 to 48, a through-hole 50, a plurality of fixing holes 52, a plurality of attaching holes 54, and the like. The plurality of counter-sunk processed surfaces 40 to 48 is horizontal surfaces lower than a surface of the base 10, and is formed by counter-sink processing the surface of the base 10. The counter-sunk processed surface 40 spans to one long side and one short side of a pair of long sides and a pair of short sides of the base 10. In contrast, the other counter-sunk processed surfaces 42 to 48 are each surrounded by wall surfaces extending upward from each edge.

The laser oscillator 12 is placed on the counter-sunk processed surface 40. A safety relay unit (not shown) is placed on the counter-sunk processed surface 42. The safety relay unit is provided with an emergency stop circuit, a restart circuit and the like of the laser marker 1 of the illustrative embodiment. The galvano substrate 18 is placed on the counter-sunk processed surface 44. The galvano scanner is placed on the counter-sunk processed surface 46. A mirror unit (not shown) for guiding the laser light to the galvano scanner is placed on the counter-sunk processed surface 48. The through-hole 50 is a hole in which the fθ lens 102 (refer to FIG. 11) is fitted. The fixing hole 52 is a hole in which the fixing screw 26 is screwed. The attaching hole 54 is a hole in which the attaching screw 28 is screwed.

The counter-sunk processed surface 40 is provided with an upstream-side first guide portion 56, a downstream-side first guide portion 58, a sidewall part 60, a pair of restriction parts 62, four fixing holes 64, and a protrusion 66.

The upstream-side first guide portion 56 and the downstream-side first guide portion 58 are pins protruding from the counter-sunk processed surface 40, and are provided side by side in a long side direction of the base 10. Note that, in the illustrative embodiment, the long side direction of the base 10 is parallel to the mounting direction MD. Therefore, in the below, the base 10 and the like are described using the mounting direction MD.

That is, the upstream-side first guide portion 56 is provided on an upstream side with respect to the mounting direction MD. The downstream-side first guide portion 58 is provided on a further downstream side than the upstream-side first guide portion 56 with respect to the mounting direction MD. Note that, in descriptions below, in a case where the upstream-side first guide portion 56 and the downstream-side first guide portion 58 are collectively referred without identifying the same, they are denoted as the first guide portions 56 and 58.

The sidewall part 60 is a wall surface extending upward from an edge of the counter-sunk processed surface 40 in the vicinity of the center of the base 10 in the short side direction and formed along the mounting direction MD. The pair of restriction parts 62 is formed as parts of a wall surface extending upward from an edge of the counter-sunk processed surface 40 on a further downstream side than the downstream-side first guide portion 58 with respect to the mounting direction MD protrude toward the upstream side with respect to the mounting direction MD, and is wall surfaces formed along a direction orthogonal to the mounting direction MD (hereinbelow, referred to as 'the orthogonal direction to the mounting direction MD'). The pair of restriction parts 62 is located on both sides of the downstream-side first guide portion 58 in the orthogonal direction to the mounting direction MD and on a further downstream side than the downstream-side first guide portion 58 with respect to the mounting direction MD. Note that, in the illustrative embodiment, the orthogonal direction to the mounting direction MD is parallel to the short side direction of the base 10, in planar view of FIG. 2 and the like.

The four fixing holes 64 are provided on both sides of the first guide portions 56 and 58 in the orthogonal direction to the mounting direction MD. The protrusion 66 is provided on a further upstream side than the upstream-side first guide portion 56 with respect to the mounting direction MD, and the fan is placed thereon.

The base 10 is provided with the four fixing holes 68 in the vicinity of the counter-sunk processed surfaces 46 and 48 located on the downstream side with respect to the mounting direction MD. The fixing holes 68 are holes in which the fixing screws 26 are screwed.

(3) Details of Scanner

Figure 4:
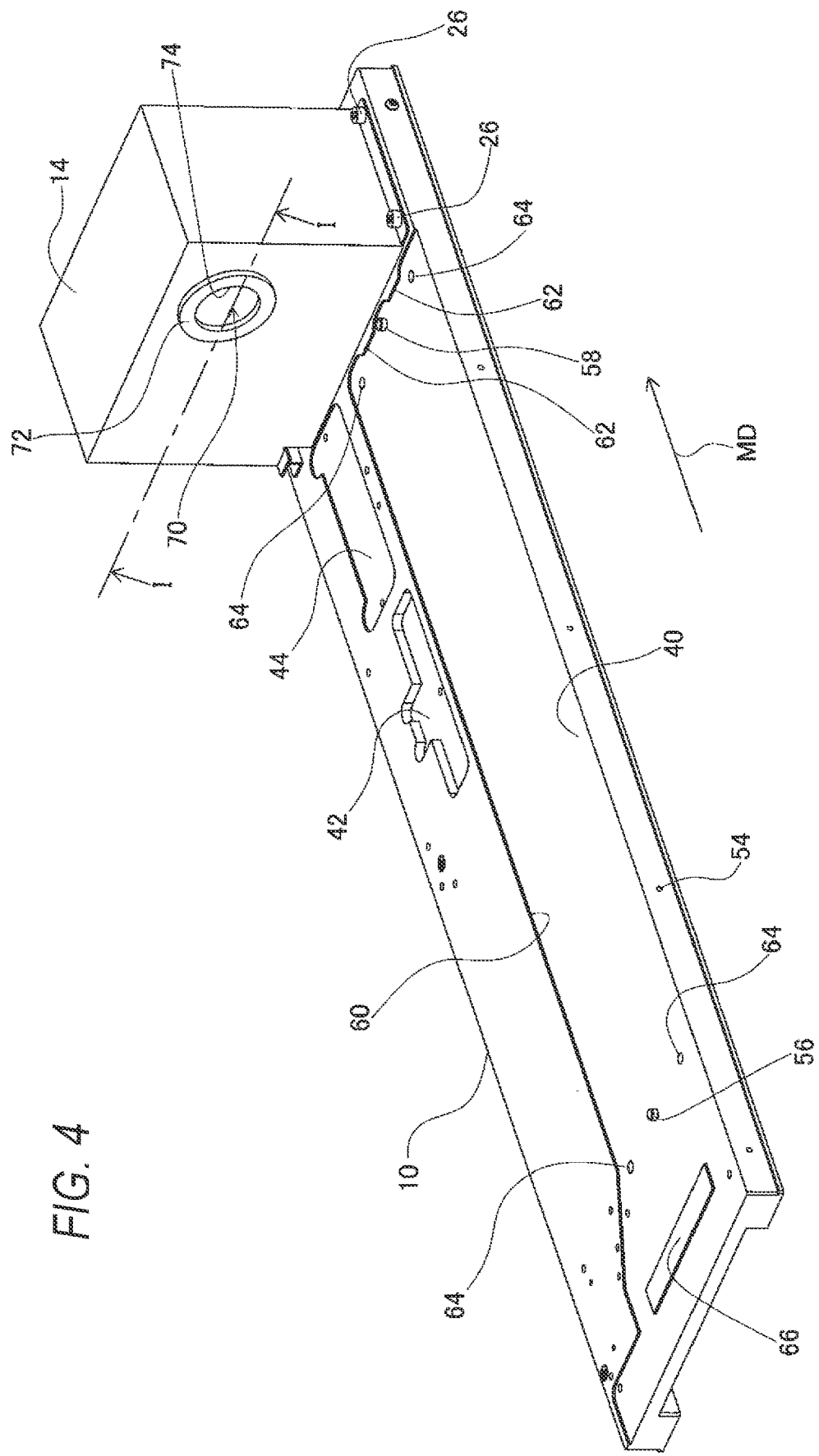
FIG. 4 is a perspective view depicting a scanner and the base of the laser marker.

As shown in FIG. 4, (the housing of) the scanner 14 is fixed to the base 10 by the fixing screws 26 screwed in the fixing holes 68. Thereby, (the housing of) the scanner 14 is provided vertically to the base 10 in a state where a side on an upstream side with respect to the mounting direction MD is located on a further downstream side than the pair of restriction parts 62 with respect to the mounting direction MD. Also, at the side of (the housing of) the scanner 14 on the upstream side with respect to the mounting direction MD, a circular penetrated insertion part 70 is provided. The insertion part 70 is provided with a circular ring-shaped elastic body 72. The elastic body 72 is constituted by a sponge made of resin, for example, and is formed with a circular through-hole 74.

(4) Details of Laser Oscillator

Figure 5:
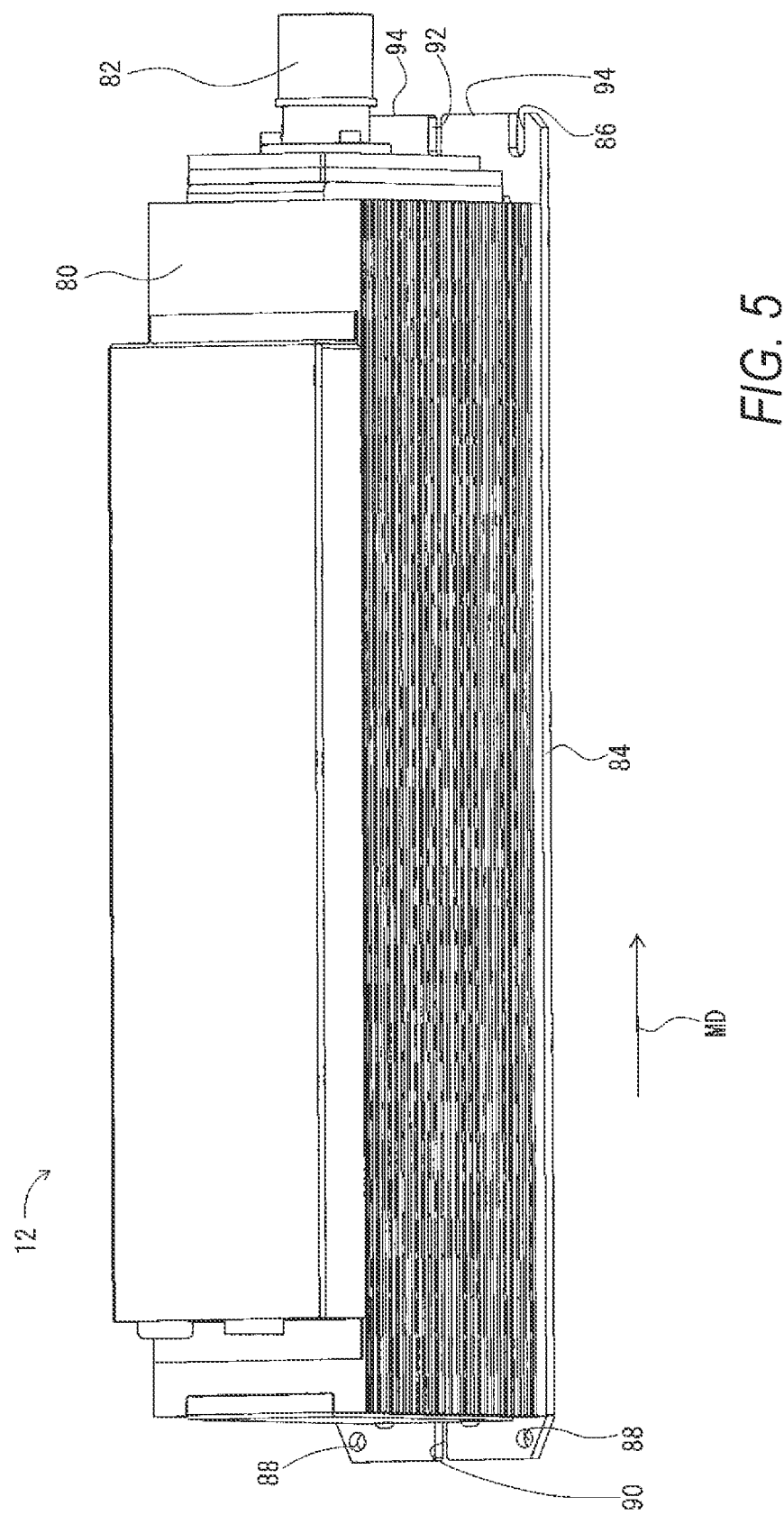
FIG. 5 is a perspective view depicting a laser oscillator of the laser marker.
Figure 6:
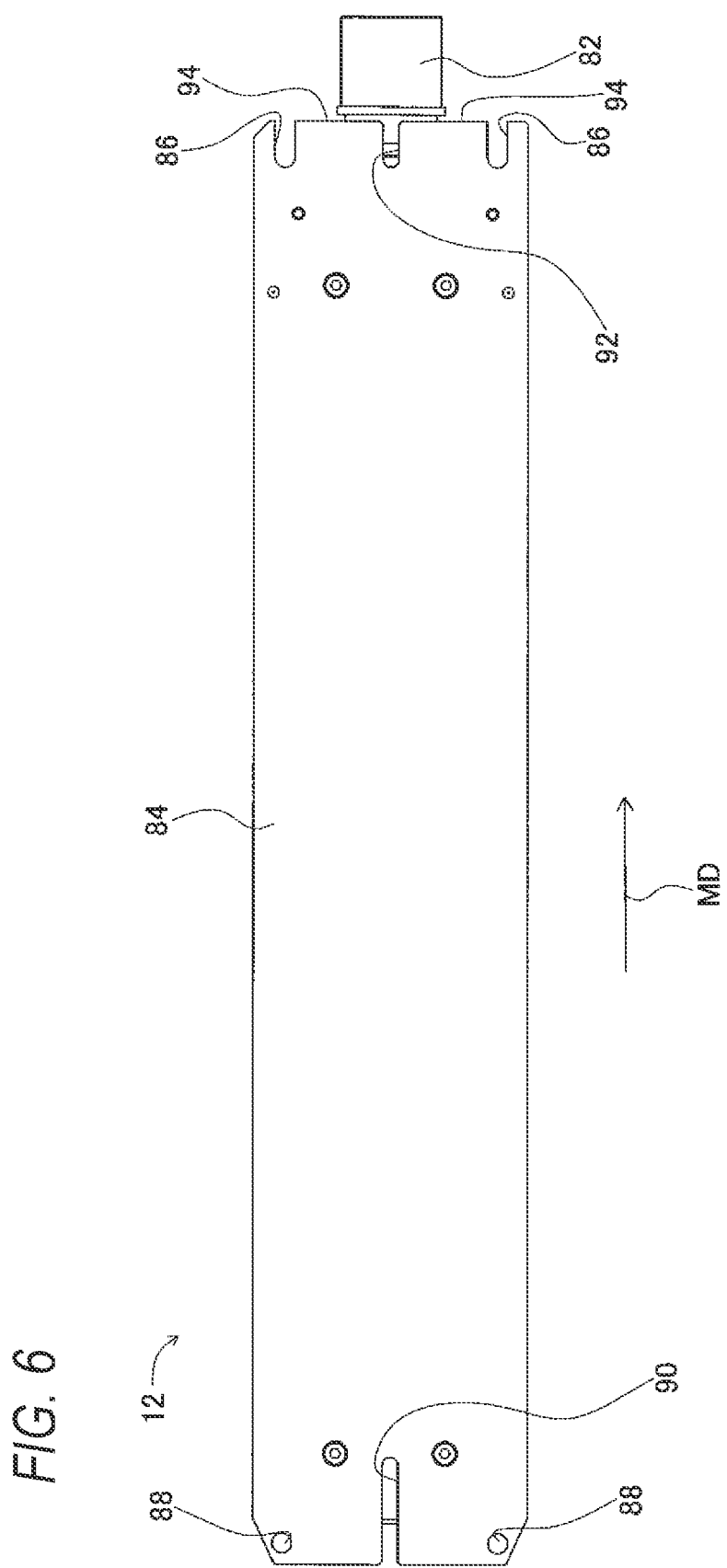
FIG. 6 is a bottom view depicting the laser oscillator.

As shown in FIGS. 5 and 6, the laser oscillator 12 has a main body 80, an expander 82, a plate 84, and the like. The main body 80 is a substantially cuboid case, and the $CO_2$ laser, YAG laser and the like are accommodated therein. The expander 82 is configured to adjust a light diameter of the laser light emitted from the $CO_2$ laser, YAG laser and the like. The expander 82 protrudes from a side surface of the main body 80. The plate 84 is substantially rectangular, is notched at four corners and is fixed to a bottom surface of the main body 80.

Note that, in the illustrative embodiment, in a case where the laser oscillator 12 is fixed to the base 10, a longitudinal direction of the main body 80 and the plate 84 corresponds to the mounting direction MD. Therefore, in the below, the laser oscillator 12 is described using the mounting direction MD.

The plate 84 protrudes from the main body 80 on the upstream side and the downstream side with respect to the mounting direction MD. An end portion of the plate 84 on the upstream side with respect to the mounting direction MD is formed with a pair of fixing holes 88. In contrast, an end portion of the plate 84 on the downstream side with respect to the mounting direction MD is formed with a pair of fixing slits 86 along the mounting direction MD. The pair of fixing slits 86 reaches a side surface of the plate 84 on the downstream side with respect to the mounting direction MD and is thus opened.

The end portion of the plate 84 on the upstream side with respect to the mounting direction MD is provided with an upstream-side second guide portion 90. The end portion of the plate 84 on the downstream side with respect to the mounting direction MD is provided with a downstream-side second guide portion 92. That is, the upstream-side second guide portion 90 is provided on the upstream side with respect to the mounting direction MD. The downstream-side second guide portion 92 is provided on a further downstream side than the upstream-side second guide portion 90 with respect to the mounting direction MD.

The upstream-side second guide portion 90 and the downstream-side second guide portion 92 are slits located at a center of the plate 84 in the orthogonal direction to the mounting direction MD and formed along the mounting direction MD. Therefore, at the end portion of the plate 84 on the upstream side with respect to the mounting direction MD, the upstream-side second guide portion 90 is located at a center between the pair of fixing holes 88 in the orthogonal direction to the mounting direction MD. In addition, at the end portion of the plate 84 on the downstream side with respect to the mounting direction MD, the downstream-side second guide portion 92 is located at a center between the pair of fixing slits 86 in the orthogonal direction to the mounting direction MD. Note that, in descriptions below, in a case where the upstream-side second guide portion 90 and the downstream-side second guide portion 92 are collectively referred without identifying the same, they are denoted as the second guide portions 90 and 92.

At the end potion of the plate 84 on the downstream side with respect to the mounting direction MD, a pair of contact parts 94 is provided between the pair of fixing slits 86 and the downstream-side second guide portion 92. That is, the downstream-side second guide portion 92 is located between the pair of contact parts 94 in the orthogonal direction to the mounting direction MD. The pair of contact parts 94 is parts of a side surface of the plate 84 on the downstream side with respect to the mounting direction MD, and is wall surfaces formed along the orthogonal direction to the mounting direction MD.

(5) Details of Second Guide Portion

Figure 7:
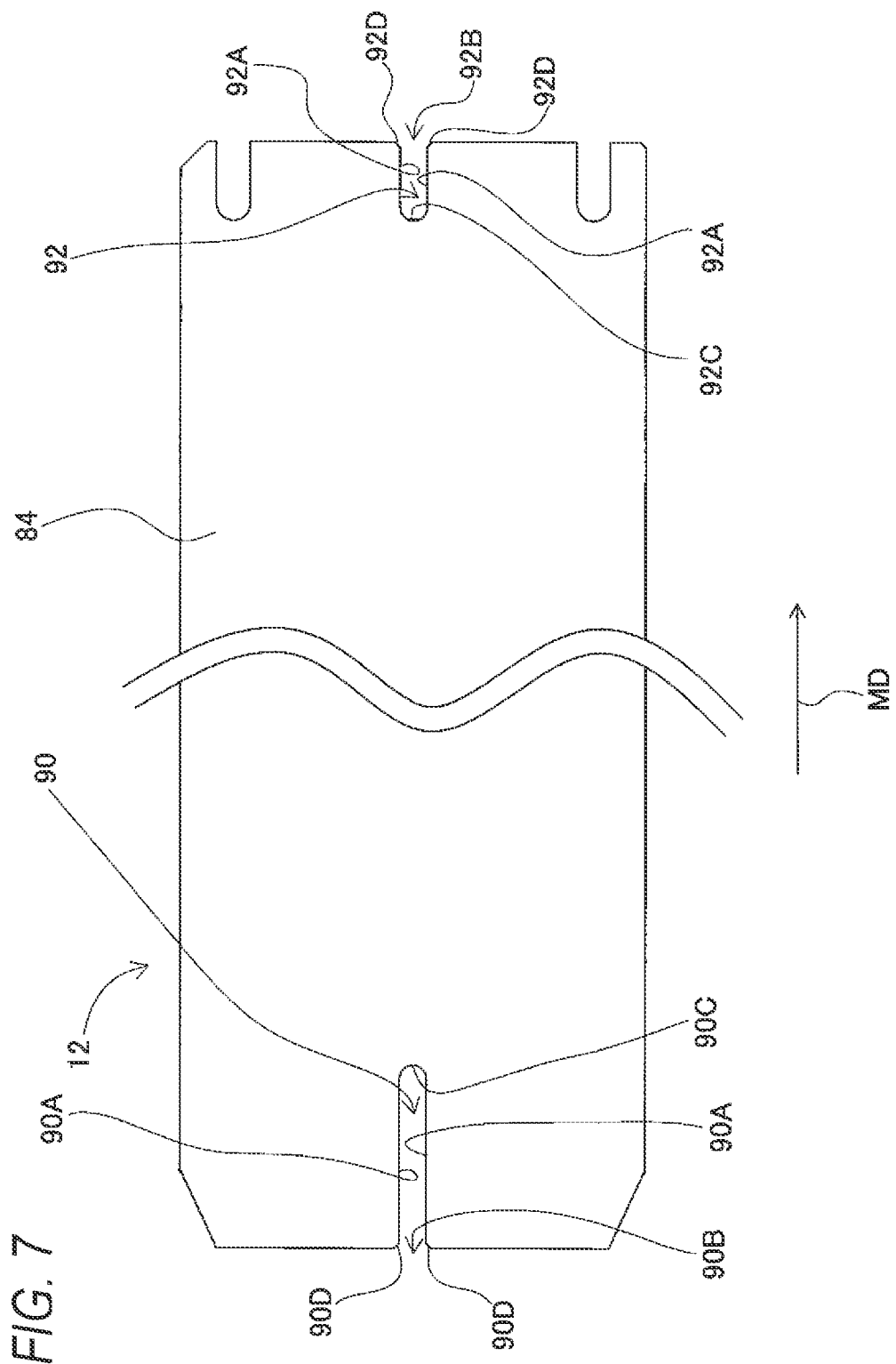
FIG. 7 depicts second guide portions (slits) of the laser oscillator.

As shown in FIG. 7, in the laser oscillator 12, the end portion of the plate 84 on the upstream side with respect to the mounting direction MD is formed with the upstream-side second guide portion 90. The upstream-side second guide portion 90 is a slit, and is constituted by a pair of long walls 90A and the like. The pair of long walls 90A is formed along the mounting direction MD, and faces each other in the orthogonal direction to the mounting direction MD. The pair of long walls 90A has an open end 90B and a closed end 90C. The open end 90B is opened such that upstream sides (i.e., an outer side of the laser oscillator 12) of the pair of long walls 90A with respect to the mounting direction MD reach a side surface of the plate 84. The open end 90B is formed with notched portions 90D by chamfering corner portions connecting the pair of long walls 90A and the side surface of the plate 84 each other. In contrast, the closed end 90C is closed such that downstream sides (i.e., an inner side of the laser oscillator 12) of the pair of long walls 90A with respect to the mounting direction MD are connected.

In the laser oscillator 12, the end portion of the plate 84 on the downstream side with respect to the mounting direction MD is formed with the downstream-side second guide portion 92. The downstream-side second guide portion 92 is a slit, and is constituted by a pair of long walls 92A and the like. The pair of long walls 92A is formed along the mounting direction MD, and faces each other in the orthogonal direction to the mounting direction MD. The pair of long walls 92A has an open end 92B and a closed end 92C. The open end 92B is opened such that downstream sides (i.e., an outer side of the laser oscillator 12) of the pair of long walls 92A with respect to the mounting direction MD reach a side surface of the plate 84. The open end 92B is formed with notched portions 92D by chamfering corner portions connecting the pair of long walls 92A and the side surface of the plate 84 each other. In contrast, the closed end 92C is closed such that upstream sides (i.e., an inner side of the laser oscillator 12) of the pair of long walls 92A with respect to the mounting direction MD are connected.

Figure 8:
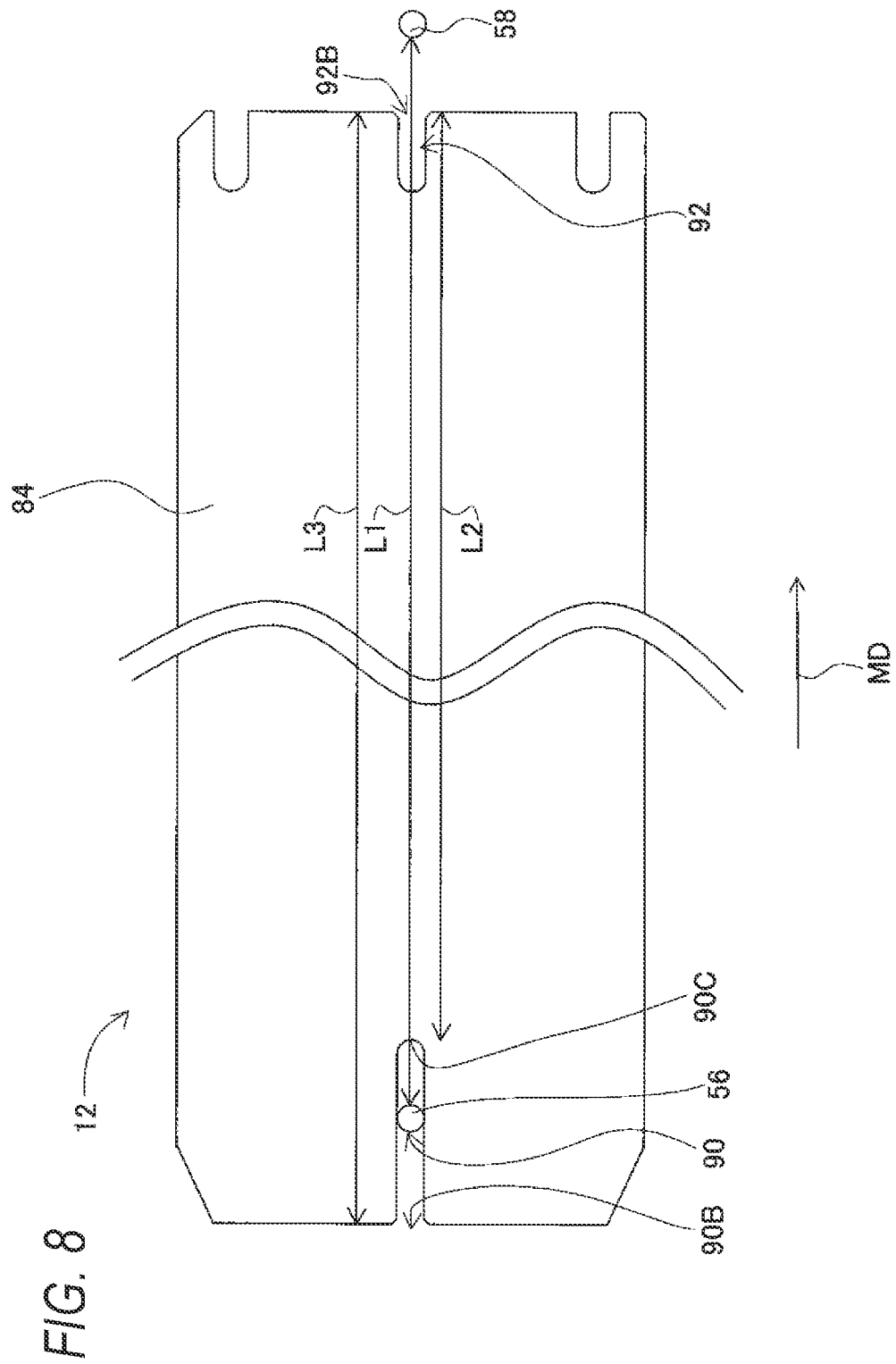
FIG. 8 depicts the second guide portions (slits) and first guide portions (pins) of the base.

The second guide portions 90 and 92 of the laser oscillator 12 and the first guide portions 56 and 58 of the base 10 are provided so as to meet dimensional relationships shown in FIG. 8. The dimensional relationship shown in FIG. 8 includes a first dimensional relationship and a second dimensional relationship. The first dimensional relationship indicates that a distance L1 between sides, which face each other, of the upstream-side first guide portion 56 and the downstream-side first guide portion 58 of the base 10 is equal to or greater than a distance L2 between the closed end 90C of the upstream-side second guide portion 90 and the open end 92B of the downstream-side second guide portion 92 of the laser oscillator 12. The second dimensional relationship indicates that the distance L1 is smaller than a distance L3 between the open end 90B of the upstream-side second guide portion 90 and the open end 92B of the downstream-side second guide portion 92 of the laser oscillator 12.

Figure 9:
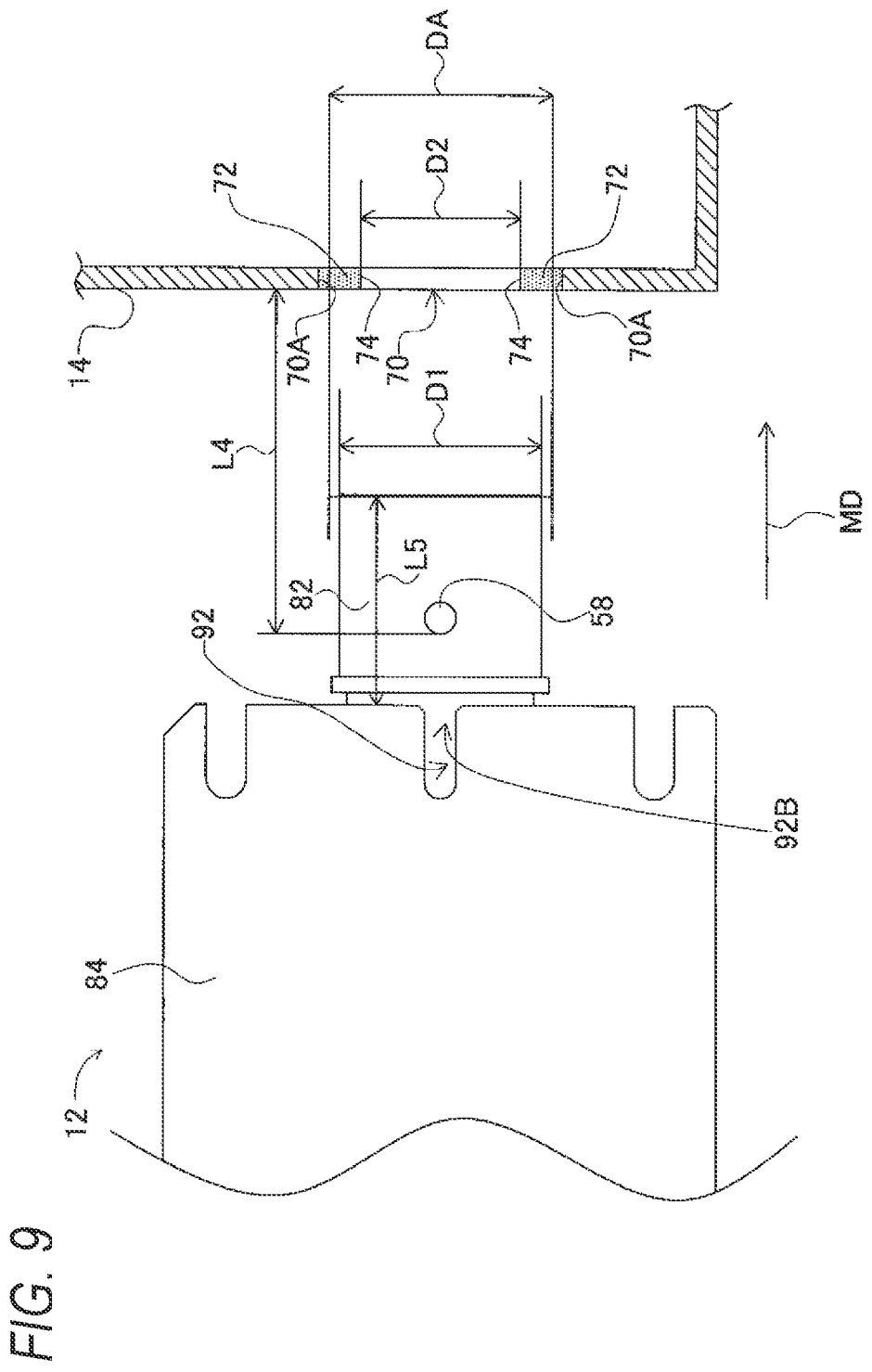
FIG. 9 depicts the laser oscillator, and a section of the scanner taken along a line I-I of FIG. 4.

In addition, the open end 92B of the downstream-side second guide portion 92 of the laser oscillator 12 and the downstream-side first guide portion 58 of the base 10 are provided so as to meet a dimensional relationship shown in FIG. 9. The dimensional relationship shown in FIG. 9 indicates that, as for a distance in the mounting direction MD, a distance L4 between an upstream side of the insertion part 70 of the scanner 14 of the base 10 with respect to the mounting direction and an upstream side of the downstream-side first guide portion 58 with respect to the mounting direction is greater than a distance L5 between a tip end of the expander 82 and the open end 92B of the downstream-side second guide portion 92 of the laser oscillator 12.

(6) Details of Insertion Part and the Like of Scanner

As shown in FIG. 9, the insertion part 70 of (the housing of) the scanner 14 is provided with the elastic body 72 over an entire area of an inner peripheral surface 70A. As described above, the through-hole 74 of the elastic body 72 is circular, and has a diameter D2 smaller than an outer diameter D1 of the expander 82 of the laser oscillator 12.

A position of the expander 82 can be changed by an adjusting mechanism provided to the laser oscillator 12. As described later, in a state where positioning of the laser oscillator 12 is performed, the position of the expander 82 can be changed within a predetermined area DA in the orthogonal direction to the mounting direction MD by the adjusting mechanism. The predetermined area DA is smaller than the insertion part 70 of (the housing of) the scanner 14.

Figure 10:
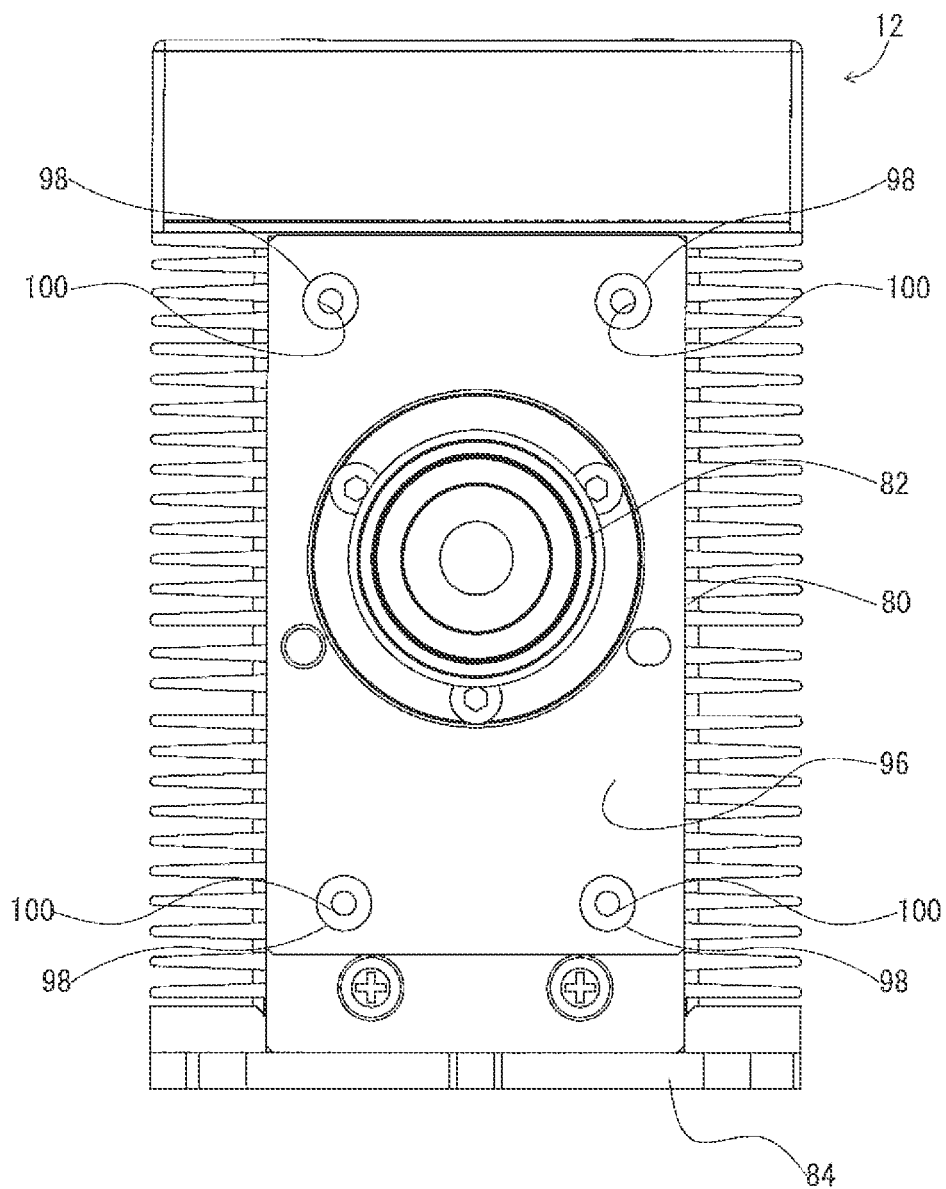
FIG. 10 depicts the laser oscillator.

As shown in FIG. 10, in the laser oscillator 12, the expander 82 is fixed to the main body 80 above the plate 84. The fixing is made by fixing screws (not shown) screwed in fixing holes 100 of the main body 80 via fixing holes 98 of a flange 96 projecting from the expander 82. The fixing holes 98 of the flange 96 are each a clearance hole larger than the fixing hole 100 of the main body 80, and enables the fixed position of the expander 82 to be adjusted. In the laser oscillator 12, the adjusting mechanism is constituted in this way.

(7) Positioning of Laser Oscillator

In the below, positioning of the laser oscillator 12 with respect to the scanner 14 of the base 10 is described. In a case where positioning of the laser oscillator 12 with respect to the scanner 14 of the base 10 is performed, an operator sets the laser oscillator 12 such that the expander 82 faces toward the scanner 14 of the base 10, and then brings a side surface of the plate 84 of the laser oscillator 12 into contact with the sidewall part 60 (refer to FIG. 4) of the base 10.

Thereafter, the operator brings a bottom surface of the plate 84 of the laser oscillator 12 close to the counter-sunk processed surface 40 of the base 10 while bringing the side surface of the plate 84 of the laser oscillator 12 into contact with the sidewall part 60 of the base 10. In addition, the operator places the bottom surface of the plate 84 of the laser oscillator 12 on the counter-sunk processed surface 40 of the base 10 while spacing slightly the side surface of the plate 84 of the laser oscillator 12 and the sidewall part 60 of the base 10. At this time, for example, as shown in FIG. 8, the operator fits the upstream-side first guide portion (pin) 56 of the base 10 into the upstream-side second guide portion (slit) 90 of the laser oscillator 12, and locates the open end 92B of the downstream-side second guide portion (slit) 92 of the laser oscillator 12 on a further downstream side than the downstream-side first guide portion (pin) 58 of the base 10 with respect to the mounting direction MD.

Then, the operator causes the laser oscillator 12 placed on the base 10 to slide toward the scanner 14 of the base 10, thereby fitting the downstream-side first guide portion (pin) 58 of the base 10 into the downstream-side second guide portion (slit) 92 of the laser oscillator 12 via the open end 92B. In such a state, in a case where the operator causes the laser oscillator 12 placed on the base 10 to slide toward the scanner 14 of the base 10, the second guide portions (slits) 90 and 92 of the laser oscillator 12 and the first guide portions (pins) 56 and 58 of the base 10 are engaged with each other, so that the laser oscillator 12 moves on the base 10 in the mounting direction MD. Thereby, the mounting direction MD is defined.

In the meantime, the predetermined area DA of the expander 82 is included in the insertion part 70 of (the housing of) the scanner 14, as seen in the mounting direction MD.

Figure 11:
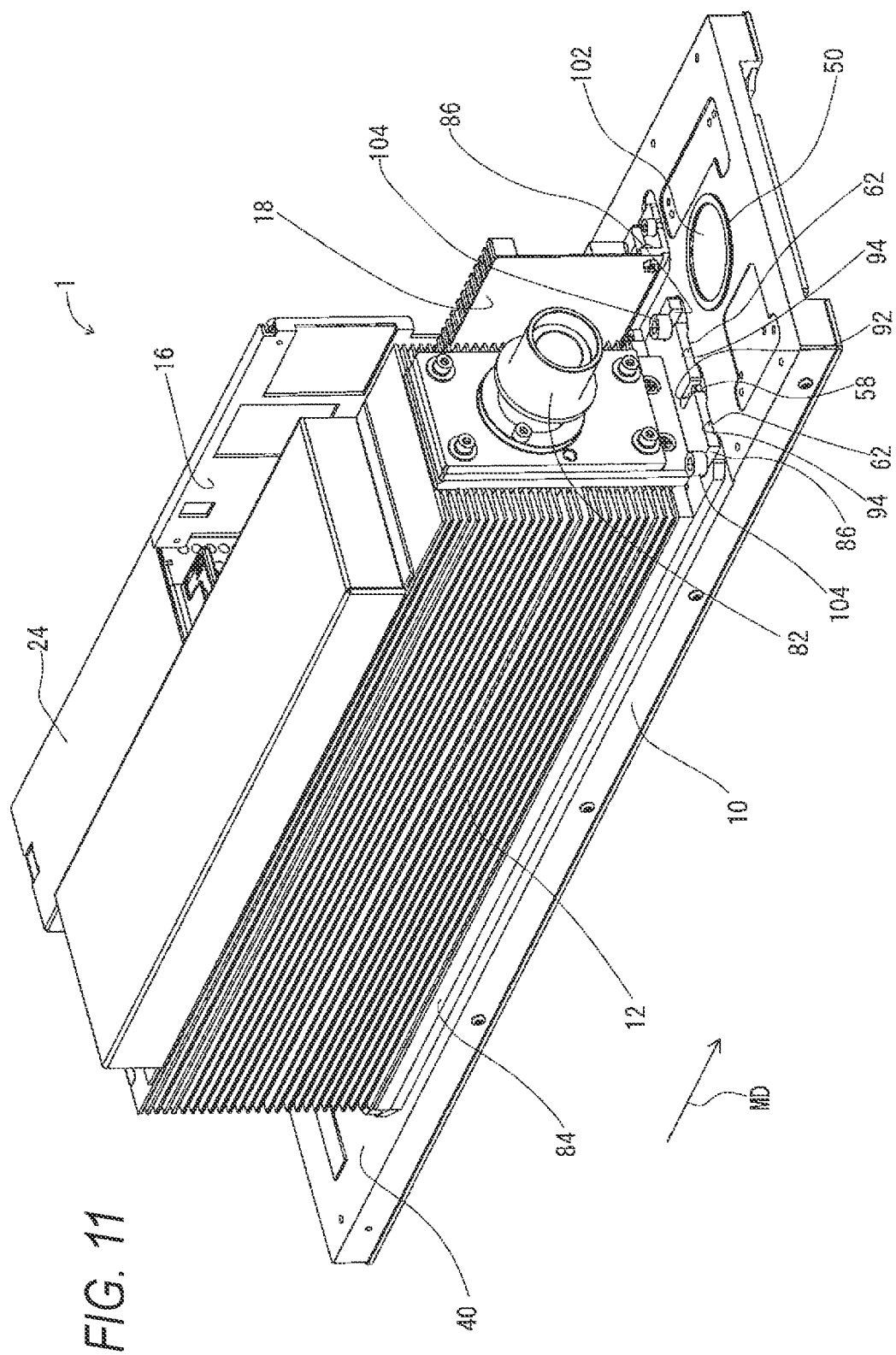
Figure 12:
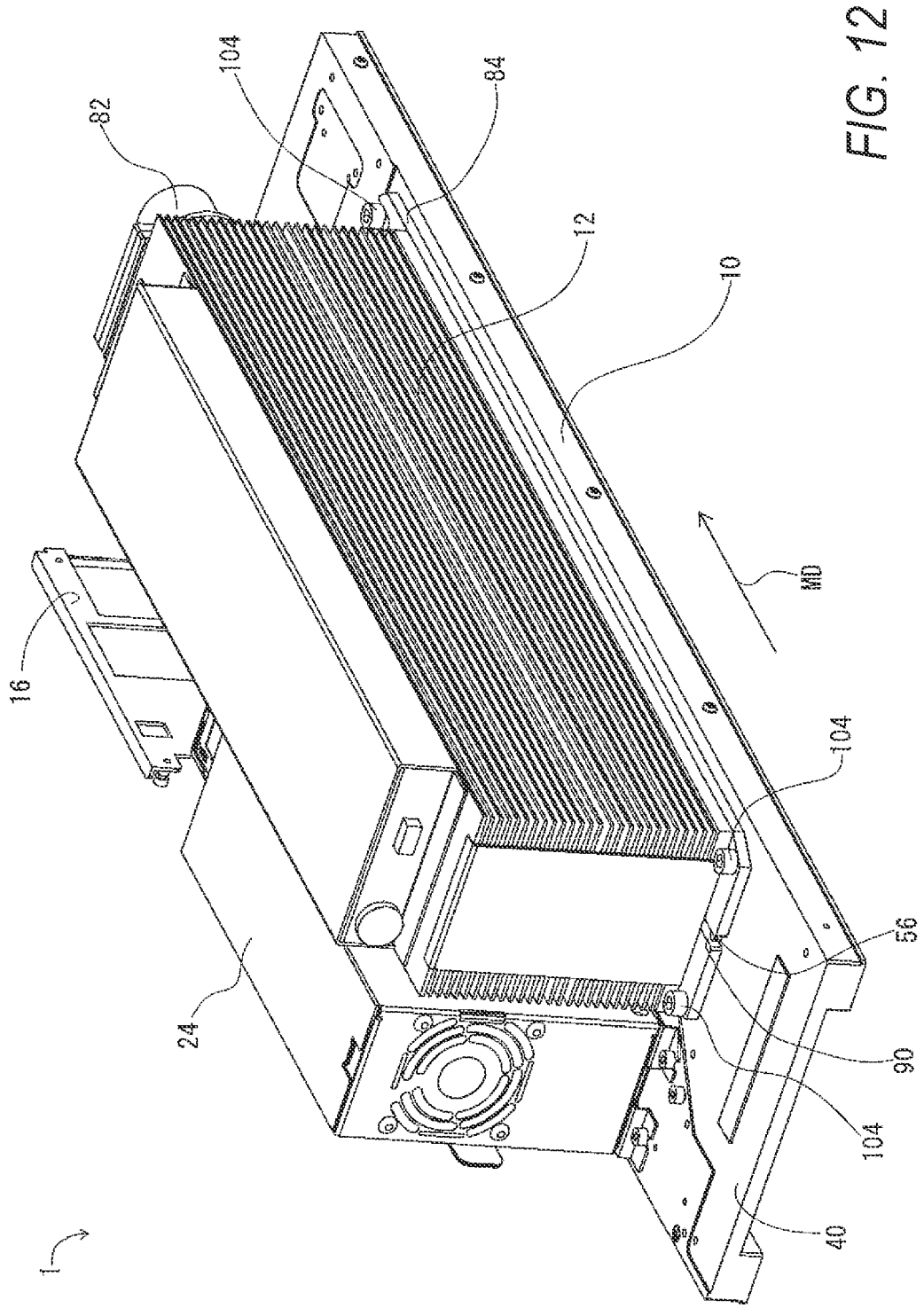

Further, in a case where the operator moves the laser oscillator 12 placed on the base 10 in the mounting direction MD, the contact parts 94 of the laser oscillator 12 are butted against the restriction parts 62 of the base 10, as shown in FIG. 11, so that the laser oscillator 12 is restricted from moving in the mounting direction MD. At this time, the expander 82 of the laser oscillator 12 is inserted into the through-hole 74 of the elastic body 72 while compressing the elastic body 72 in the insertion part 70 of (the housing of) the scanner 14.

In a case where the laser oscillator 12 is restricted from moving in the mounting direction MD, as described above, the operator completes the positioning of the laser oscillator 12 with respect to the scanner 14 of the base 10 in a state where the contact parts 94 of the laser oscillator 12 are brought into contract with the restriction parts 62 of the base 10.

Thereafter, the operator screws fixing screws 104 into the fixing holes 64 of the base 10 via the fixing slits 86 of the laser oscillator 12 on the downstream side of the laser oscillator 12 with respect to the mounting direction MD. In addition, the operator screws the fixing screws 104 shown in FIG. 12 into the fixing holes 64 of the base 10 via the fixing holes 88 of the laser oscillator 12 on the upstream side of the laser oscillator 12 with respect to the mounting direction MD. Thereby, the laser oscillator 12 is attached to the base 10 in a state where the expander 82 is mounted to the insertion part 70 of (the housing of) the scanner 14.

Note that, by performing the above operation in a reverse order to the above-described order, the operator can remove the laser oscillator 12 from the base 10 while extracting the expander 82 of the laser oscillator 12 from the insertion part 70 of (the housing of) the scanner 14.

(8) Summary

As described above in detail, according to the laser marker 1 of the illustrative embodiment, the laser oscillator 12 is slid with being placed on the base 10. Thereby, while the expander 82 of the laser oscillator 12 is inserted in the insertion part 70 of the scanner 14, the laser oscillator 12 is removably mounted to the scanner 14. At this time, the first guide portions 56 and 58 of the base 10 and the second guide portions 90 and 92 of the laser oscillator 12 are engaged with each other, so that the mounting direction MD of the laser oscillator 12 is defined. In addition, the contact parts 94 of the laser oscillator 12 are butted against the restriction parts 62 of the base 10, so that the laser oscillator 12 is restricted from sliding on the base 10. Further, the contact parts 94 of the laser oscillator 12 are in contact with the restriction parts 62 of the base 10, so that the positioning of the laser oscillator 12 on the base 10 is completed. In this way, according to the laser marker 1 of the illustrative embodiment, the positioning of the laser oscillator 12 is performed with accuracy with respect to the scanner 14 into which the expander 82 of the laser oscillator 12 is inserted.

The first guide portions 56 and 58 are pins protruding from the base 10. The second guide portions 90 and 92 are constituted by the pair of long walls 90A and 92A provided facing each other to the laser oscillator 12. Therefore, according to the laser marker 1 of the present illustrative embodiment, the first guide portions 56 and 58 and the second guide portions 90 and 92 for performing the above-described positioning are implemented by the simple configuration.

In addition, the downstream-side second guide portion 92 of the laser oscillator 12 has the notched portions 92D provided at the open end 92B. Thereby, at the downstream-side second guide portion 92 of the laser oscillator 12, an interval between the pair of long walls 92A at the open end 92B is greater than an interval between the pair of long walls 92A at a central portion of the downstream-side second guide portion. Therefore, the downstream-side first guide portion 58 of the base 10 can be easily fitted to the downstream-side second guide portion 92 of the laser oscillator 12 via the open end 92B. For this reason, according to the laser marker 1 of the illustrative embodiment, the downstream-side first guide portion 58 is difficult to be crushed by the plate 84 of the laser oscillator 12.

Further, the first guide portions 56 and 58 are constituted by the upstream-side first guide portion 56 located on the upstream side of the base 10 with respect to the mounting direction MD and the downstream-side first guide portion 58 located on a further downstream side than the upstream-side first guide portion 56 with respect to the mounting direction MD. Also, the second guide portions 90 and 92 are constituted by the upstream-side second guide portion 90 located on the upstream side of the laser oscillator 12, which is configured to slide on the base 10 in the mounting direction MD, with respect to the mounting direction MD and the downstream-side second guide portion 92 located on the further downstream side than the upstream-side second guide portion 90 with respect to the mounting direction MD. For this reason, according to the laser marker 1 of the illustrative embodiment, since the first guide portions 56 and 58 of the base 10 and the second guide portions 90 and 92 of the laser oscillator 12 are engaged with each other on both sides in the mounting direction MD, the positioning accuracy of the laser oscillator 12 with respect to the scanner 14 is high.

Furthermore, the distance L1 between sides, which face each other, of the upstream-side first guide portion 56 (pin) and the downstream-side first guide portion (pin) 58 of the base 10 is equal to or greater than the distance L2 between the closed end 90C of the upstream-side second guide portion (slit) 90 and the open end 92B of the downstream-side second guide portion (slit) 92 of the laser oscillator 12, and is smaller than the distance L3 between the open end 90B of the upstream-side second guide portion (slit) 90 and the open end 92B of the downstream-side second guide portion (slit) 92 of the laser oscillator 12.

For this reason, even in a state where the upstream-side first guide portion (pin) 56 of the base 10 is engaged with the upstream-side second guide portion (slit) 90 of the laser oscillator 12, the downstream-side first guide portion (pin) 58 of the base 10 can be located on a further downstream side than the downstream-side second guide portion (slit) 92 of the laser oscillator 12 with respect to the mounting direction MD. In addition, even in a case where the laser oscillator 12 is slid with being placed on the base 10 and the downstream-side first guide portion (pin) 58 of the base 10 and the downstream-side second guide portion (slit) 92 of the laser oscillator 12 are thus engaged with each other, the state where the upstream-side first guide portion (pin) 56 of the base 10 is engaged with the upstream-side second guide portion (slit) 90 of the laser oscillator 12 is kept.

For this reason, according to the laser marker 1 of the illustrative embodiment, the engagement between the upstream-side first guide portion (pin) 56 of the base 10 and the upstream-side second guide portion (slit) 90 of the laser oscillator 12 is preceded and kept, so that the downstream-side first guide portion (pin) 58 of the base 10 and the downstream-side second guide portion (slit) 92 of the laser oscillator 12 can be easily engaged in a subsequent step.

In addition, as for the distance in the mounting direction MD, the distance L4 between the upstream side of the insertion part 70 of the scanner 14 of the base 10 with respect to the mounting direction and the upstream side of the downstream-side first guide portion (pin) 58 with respect to the mounting direction is greater than the distance L5 between the tip end of the expander 82 and the open end 92B of the downstream-side second guide portion (slit) 92 of the laser oscillator 12. For this reason, according to the laser marker 1 of the illustrative embodiment, before the expander 82 of the laser oscillator 12 is inserted in the insertion part 70 of the scanner 14 of the base 10, the downstream-side first guide portion (pin) 58 of the base 10 and the downstream-side second guide portion (slit) 92 of the laser oscillator 12 are engaged, so that the positioning can be performed in the orthogonal direction to the mounting direction MD.

The base 10 also has the sidewall part 60 provided along the mounting direction MD. In a state where the first guide portions 56 and 58 of the base 10 and the second guide portions 90 and 92 of the laser oscillator 12 are engaged with each other, the sidewall part 60 is located in the orthogonal direction to the mounting direction with respect to the laser oscillator 12. For this reason, according to the laser marker 1 of the illustrative embodiment, in a case where the laser oscillator 12 on the base 10 is placed, based on the laser oscillator 12 is brought into contact with the sidewall part 60, the position of the laser oscillator 12 is roughly determined in the orthogonal direction to the mounting direction MD. Therefore, the first guide portions 56 and 58 of the base 10 and the second guide portions 90 and 92 of the laser oscillator 12 can be easily engaged.

The laser oscillator 12 also has the adjusting mechanism configured to change the position of the expander 82 within the predetermined area DA in the orthogonal direction to the mounting direction MD. The insertion part 70 of the scanner 14 of the base 10 includes the predetermined area DA in a case where the laser oscillator 12 is mounted to the base 10, as seen in the mounting direction MD. Therefore, the laser marker 1 of the illustrative embodiment can accept individual differences with respect to the position of the expander 82 in the laser oscillator 12.

The base 10 also has the elastic body 72 provided along the circumference of the inner peripheral surface 70A of the insertion part 70 of the scanner 14. The elastic body 72 is formed with the through-hole 74 having the diameter D2 smaller than the outer diameter D1 of the expander 82 of the laser oscillator 12. By this configuration, in a case where the laser oscillator 12 is mounted to the scanner 14, the expander 82 is inserted in the through-hole 74 while compressing the elastic body 72. Thereby, the laser marker 1 of the illustrative embodiment improves dustproof in the scanner 14.

Additionally describing, in the illustrative embodiment, the scanner 14 is an example of "the scanner". The distance L3 is an example of "the distance between the open ends of the upstream-side second guide portion and the downstream-side second guide portion of the laser oscillator".

(9) Modified Illustrative Embodiments

Note that, the present disclosure is not limited to the illustrative embodiment, and can be diversely changed without departing from the gist thereof.

For example, (the housing of) the scanner 14 may be provided integrally with the base 10. The restriction part 62 may be provided to (the housing of) the scanner 14. As for the first guide portions (pins) 56 and 58 and the second guide portions 90 and 92 (slit), the upstream-side first guide portion (pin) 56 and the upstream-side second guide portion 90 (slit) may be omitted.

Figure 13:
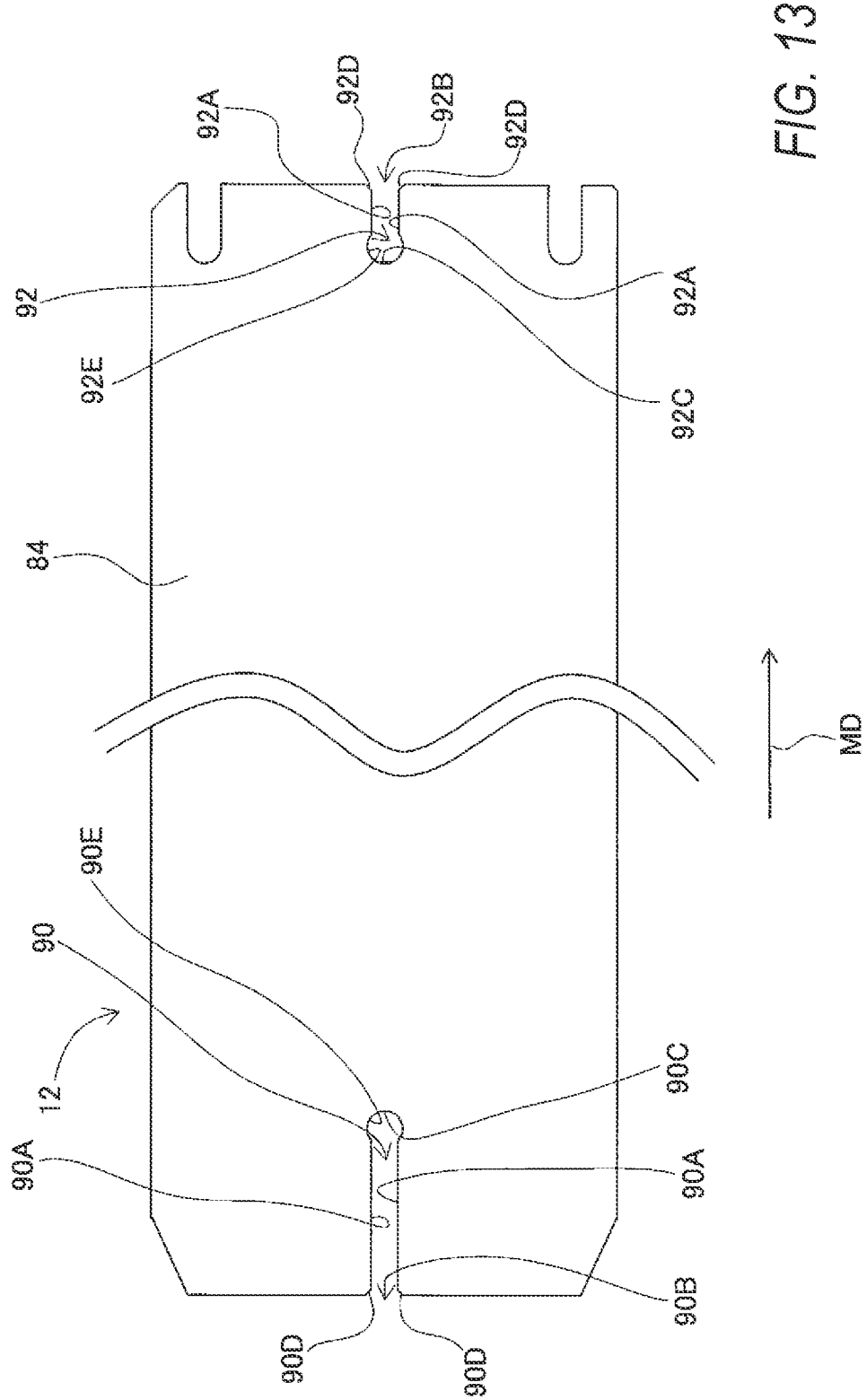
FIG. 13 depicts a modified example of the second guide portions (slits).

In addition, as shown in FIG. 13, at the upstream-side second guide portion 90 of the laser oscillator 12, a circular hole 90E having a diameter greater than the interval between the pair of long walls 90A at the central portion of the upstream-side second guide portion may be provided at an end portion on the downstream side with respect to the mounting direction MD. Thereby, at the upstream-side second guide portion 90 of the laser oscillator 12, the interval between the pair of long walls 90A at the closed end 90C is larger than the interval between the pair of long walls 90A at the central portion.

In the modified example, in a case where the bottom surface of the plate 84 of the laser oscillator 12 is placed on the counter-sunk processed surface 40 of the base 10, the upstream-side first guide portion (pin) 56 of the base 10 can be easily fitted into (the circular hole 90E of) the upstream-side second guide portion 90 of the laser oscillator 12. For this reason, the upstream-side first guide portion (pin) 56 is difficult to be crushed by the plate 84 of the laser oscillator 12.

Similarly, at the downstream-side second guide portion 92 of the laser oscillator 12, a circular hole 92E having a diameter greater than the interval between the pair of long walls 92A at the central portion of the downstream-side second guide portion may be provided at an end portion on the upstream side with respect to the mounting direction MD. Thereby, at the downstream-side second guide portion 92 of the laser oscillator 12, the interval between the pair of long walls 92A at the closed end 92C is larger than the interval between the pair of long walls 92A at the central portion.

In addition, the second guide portions 90 and 92 may also be each a groove in which both end portions thereof are closed. In this case, in a case where the bottom surface of the plate 84 of the laser oscillator 12 is placed on the countersunk processed surface 40 of the base 10, the operator fits the upstream-side first guide portion (pin) 56 of the base 10 into the upstream-side second guide portion 90 of the laser oscillator 12 and fits the downstream-side first guide portion (pin) 58 of the base 10 into the downstream-side second guide portion 92 of the laser oscillator 12.

What is claimed is:

1. A laser marker comprising:
    a base comprising:
        a first guide portion; and
        a restriction part;
    a laser oscillator configured to emit laser light, the laser oscillator being removably mounted to the base by sliding in a mounting direction and being placed on the base, the laser oscillator comprising:
        a second guide portion extending in the mounting direction, the second guide portion being configured to be engaged with the first guide portion;
        a contact part configured to be in contact with the restriction part in a case the laser oscillator is mounted to the base; and
        an expander; and
    a scanner having an insertion part, the expander being inserted into the insertion part in a case the laser oscillator is mounted to the scanner, and the scanner being configured to scan the laser light emitted from the laser oscillator,
    wherein the first guide portion comprises:
        an upstream-side first guide portion located upstream of the base in the mounting direction; and
        a downstream-side first guide portion located downstream of the upstream-side first guide portion in the mounting direction, and
    wherein the second guide portion comprises:
        an upstream-side second guide portion located on upstream of the mounting direction; and a downstream-side second guide portion located on downstream of the upstream-side second guide portion in the mounting direction, and
    wherein the upstream-side second guide portion comprises a first slit,
    wherein the downstream-side second guide portion comprises a second slit,
    wherein the upstream-side second guide portion and the downstream-side second guide portion have a closed end closed on an inner side of the laser oscillator and an open end opened on an outer side of the laser oscillator,
    wherein a first distance is equal to or greater than a second distance, the first distance being a distance between sides, which face each other, of the upstream-side first guide portion and the downstream-side first guide portion of the base, the second distance being a distance between the closed end of the upstream-side second guide portion and the open end of the downstream-side second guide portion of the laser oscillator,
    wherein the first distance is smaller than a third distance, the third distance being a distance between the open ends of the upstream-side second guide portion and the downstream-side second guide portion of the laser oscillator, and
    wherein a fourth distance is greater than a fifth distance, the fourth distance being a distance, in the mounting direction, between an upstream side of the insertion part and an upstream side of the downstream-side first guide portion, the fifth distance being a distance, in the mounting direction, between a tip end of the expander and the open end of the downstream-side second guide portion of the laser oscillator.

2. The laser marker according to claim 1,
    wherein the first guide portion comprises a pin protruding from the base, and
    wherein the second guide portion comprises a pair of long walls provided facing each other in the laser oscillator.

3. The laser marker according to claim 2,
    wherein the pair of long walls is configured such that an interval at least at one end portion of both end portions of the pair of long walls is greater than an interval at a central portion of the pair of long walls.

4. The laser marker according to claim 1, wherein the base has a sidewall part provided along the mounting direction, the sidewall part being located in a direction orthogonal to the mounting direction with respect to the laser oscillator in a state the first guide portion of the base and the second guide portion of the laser oscillator are engaged with each other.

5. The laser marker according to claim 1,
    wherein the laser oscillator comprises an adjusting mechanism configured to change a position of the expander within a predetermined area in a direction orthogonal to the mounting direction, and
    wherein the insertion part includes the predetermined area in a case the laser oscillator is mounted to the base, as seen in the mounting direction.

6. The laser marker according to claim 1,
    wherein the base comprises an elastic body provided along a circumference of an inner peripheral surface of the insertion part, the elastic body having a through-hole having a diameter smaller than an outer diameter of the expander of the laser oscillator, and
    wherein in a case the laser oscillator is mounted to the scanner, the expander is configured to compress the elastic body to be inserted in the through-hole.

* * * * *